(12) United States Patent
Doyen et al.

(10) Patent No.: US 6,963,611 B1
(45) Date of Patent: Nov. 8, 2005

(54) PROCESS AND DEVICE FOR SWITCHING DIGITAL TELEVISION PROGRAMS

(75) Inventors: Didier Doyen, La Bouexière (FR); Laurent Blonde, Thorigne-Fouillard (FR); Michel Kerdranvat, Chantepie (FR)

(73) Assignee: Thomson Licensing, Boulogne-Billancourt (FR)

( * ) Notice: Subject to any disclaimer, the term of this patent is extended or adjusted under 35 U.S.C. 154(b) by 250 days.

(21) Appl. No.: 09/595,739

(22) Filed: Jun. 16, 2000

(30) Foreign Application Priority Data

Jun. 18, 1999 (FR) .................................. 99 07712

(51) Int. Cl.⁷ ............................................. H04N 7/18
(52) U.S. Cl. ............................. 375/240.25; 375/240.29
(58) Field of Search ................ 348/6–10, 565–568, 348/570–573, 240.1–240.29; 725/20–56

(56) References Cited

U.S. PATENT DOCUMENTS 6,005,562 A * 12/1999 Shiga et al. ................. 345/721
6,115,080 A * 9/2000 Reitmeier .................... 348/731
6,353,930 B1 * 3/2002 Shimoji et al. ............. 725/110
6,481,012 B1 * 11/2002 Gordon et al. ................ 725/54

FOREIGN PATENT DOCUMENTS

| EP | 0629085 A2 | 12/1994 | ............ H04N 5/92 |
| EP | 0712242 A2 | 5/1996 | .......... H04N 5/445 |
| WO | WO9528795 | 10/1995 | |
| WO | WO 9704590 | 2/1997 | .......... H04N 5/262 |

* cited by examiner

*Primary Examiner*—Andy Rao
(74) *Attorney, Agent, or Firm*—Joseph S. Tripoli; Ronald H. Kurdyla; Jeffrey M. Navon

(57) ABSTRACT

A process for switching television programs is wherein it detects (8, 9) and then stores (10) the appended data of intra type of programs other than the selected program, selects (10) and decodes (12), upon a command (14) for the switching over to a new program, the stored appended data relating to this new program, and temporarily transmits (13), while awaiting the decoding and transmission of the current data of the new program, the decoded appended data.

Applications relate for example to the perusing of programs.

15 Claims, 1 Drawing Sheet

PROCESS AND DEVICE FOR SWITCHING DIGITAL TELEVISION PROGRAMS

BACKGROUND OF THE INVENTION

1. Field of the Invention

The invention relates to a process and a device for rapid switching of digital television programs.

2. Description of the Related Art

With the advent, some years ago, of digital television, the viewer's habits are undergoing changes. After having assimilated the concept of a pay-per-view station, he is now offered access to several tens of programs by setting up satellite reception. The label "digital" associated with this new technology reassures the consumer. For the public at large, and especially since the advent of the Compact Disc, "digital" has become synonymous with "quality".

However, the potential purchaser of digital equipment is not necessarily aware of certain constraints related to this new system. Certain functionalities of his present equipment are no longer possible with satellite reception, such as displaying a program and recording another one at the same time. He also has to wait several seconds to go from one program to another.

Indeed, when the viewer indicates, with the aid of his remote control, that he wishes to change program, the digital decoder must carry out a number of operations which are the consequence of this idle time:

take the request into account:
direct taking into account of the number of the program or increment/decrement of the number of the program in progress
calculate the parameters of the program:
modulation frequency, program identifier (PID standing for Packet IDentifier) . . .
dispatch a signal to the LNB block (the acronym standing for Low Noise Block) for satellite reception:
this signal indicates the demodulation frequency band (from 10.75 GHz to 11.70 GHz or 11.70 GHz to 12.70 GHz)
return from the satellite reception of the correct frequency band:
the demodulation frequency has been lowered so as to lie between 950 MHz and 2150 MHz
demodulation at decoder level of the frequency of the intended channel
digital demodulation of the signal
filtering of the PIDs
awaiting the first image of intra type
(definition given in the MPEG standard)
video decoding and synchronization with the audio
output by the decoder of the signal decoded and dispatched to the monitor.

The stringing together of all these operations gives rise to an idle time, resulting in a black image or an image which is frozen on the screen for around 2 to 3 seconds. This annoyance precludes fast perusal of the offerings of a package of programs.

SUMMARY OF THE INVENTION

The aim of the invention is to alleviate the aforesaid drawbacks. Its subject is a process for switching television programs, the information relating to these programs being received in the form of one or several compressed video data streams, some data relating to images of inter type and of intra type, the data of a selected program originating from the decoding of the current data of the stream which relate to this program. This process is wherein it detects and then stores the appended data of intra type of programs other than the selected program, selects and decodes, upon a command for switching over to a new program, the stored appended data relating to this new program, and then temporarily transmits, while awaiting the decoding and transmission of the current data of the new program, the decoded appended data.

Its subject is also a process for coding compressed video data streams for television program switching according to the above process, wherein data relating to pictures of various programs are detected so as to be copied, processed, re-encoded and then inserted into each of the data streams as appended data.

According to a variant embodiment, the appended data are copied on the basis of a detection of the pictures of intra type in the compressed video data streams.

According to another variant, the appended data are copied on the basis of a detection of the pictures of inter type in the compressed video data streams.

According to another variant, the processing consists in reducing the resolution of the images extracted.

According to another variant, the appended data also comprise complementary data. These complementary data can relate to a number or name of a program or the start and end time of a program in progress or of a coming program or the logo of the station broadcasting a program.

According to one variant, the appended data are also used for the creation of an imagette in the image (PIP mode).

According to one variant, the appended information is used for the creation of a mosaic or of an interactive electronic program guide.

According to one variant, the data stream is an MPEG 2 coded stream, the data packets relating to the appended data being transmitted instead of a program.

According to one variant, the data stream is an MPEG 4 coded stream and the appended data are data required for scene reconstruction and these data are inserted into this stream in accordance with the standard.

The subject of the invention is also a device for switching a television program receiving the information relating to programs in the form of one or several compressed video data streams, some data relating to images of inter type and of intra type, the device comprising a circuit for decoding, on the basis of the data streams received, the current data of the stream which relate to the program displayed. This device is wherein it also comprises:

a circuit for detecting the appended data relating to images of intra type of programs other than the program displayed
a circuit for storing these data
a circuit for selecting the stored data, the selecting being carried out on the basis of a remote control decoding circuit giving the information of the new program to be displayed
a circuit for decoding the selected data
a switching circuit receiving the output from the decoder of current data and the output from the decoder of selected data so as to temporarily switch, to the output of the device, the selected data.

The subject of the invention is also a device for coding digital television signals for the implementation of the above process. This device is wherein it comprises a circuit for detecting and copying data relating to images of various available programs, a circuit for decoding and then for reencoding the copied data and a circuit for inserting the reencoded data into the streams.

The main advantage of the invention is that it fills in the idle time present in digital television when switching from one program to another by virtue of the insertion of appended data into the digital data stream.

It uses by way of example the possibilities offered by the MPEG-4 standard in terms of scene composition and subject.

BRIEF DESCRIPTION OF THE DRAWINGS

Other characteristics and advantages of the invention will become apparent on reading the following description, given by way of example and with reference to the appended figures where.

DETAILED DESCRIPTION OF THE PREFERRED EMBODIMENT

Figure 1:
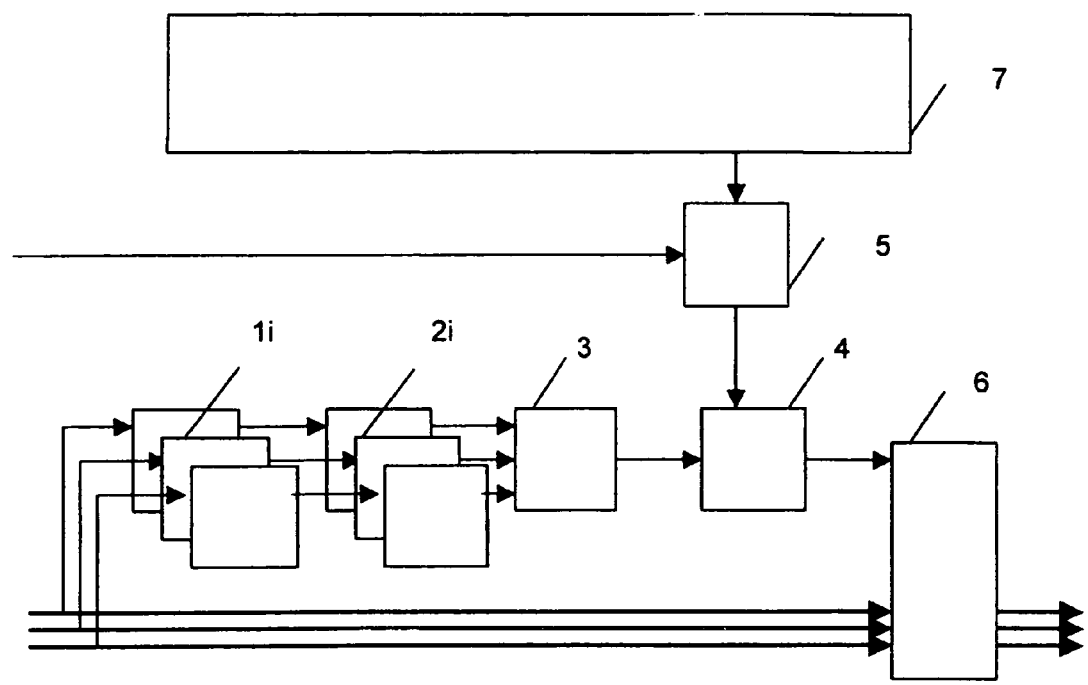
FIG. 1 represents a device for coding digital data streams according to the invention

The reception of a satellite-based digital television package consists in selecting a frequency (choice of the transponder), in receiving the corresponding signal compressed and transported, in our example, according to the MPEG 2 standard, then in demodulating this signal, this being the "tuner" function. The demodulated information is the transport stream (or TS in the MPEG 2 standard) which consists of a string of packets conveying several programs at once.

The MPEG-2 system standard defines the rules for multiplexing and for identifying the packets. The next step therefore consists in selecting the packets corresponding to the desired program, this being the demultiplexing function. This yields "video", "audio" and "auxiliary data" packets (these auxiliary data are defined in the standard and should not be confused with the appended data which are the subject of our invention or the complementary information which will be dealt with hereinafter).

To each type of datum there will correspond a particular decoding:

video decoding:

During the decoding of the signals transmitted according to the MPEG standard, the video signal has been chopped up into a group of pictures or GOP, with an I, P or B classification for each picture (I for intra, P for predicted and B for bi-directional). The MPEG-2 compression aims to eliminate the spatial and temporal redundancies of the signal. A picture is chopped up into blocks of 8*8 pixels. The first picture of a GOP is the only one which is coded in Intra mode (I image): a discrete cosine transformation DCT is applied to each block of the original image, followed by a quantization of the coefficients thus obtained. The I images will serve as reference at decoding level.

For the P images, only a prediction error associated with each pixel (residuals block) is transmitted together with at least one motion vector associated with each block. The prediction error is calculated by taking the difference between the source image and the predicted image which is the reference image reconstructed and motion-compensated on the basis of the motion vector. In fact, only this error is transmitted, after DCT and quantization.

Likewise, for the B images of bi-directional type, only the prediction error is transmitted. The quantization of this error can be coarser in so far as the B images never serve as reference for the decoding of other images.

During decoding, the reconstruction of a P image is performed on the basis of the preceding I or P image and using the motion vector associated with the block to predict the image. The prediction error information is then appended to obtain the final image.

The B images are recalculated on the basis of the I and P images by bi-directional interpolation.

It should be noted that when going from one program to another, it is necessary, in view of the coding system, to wait for an I image to commence the decoding. The most frequent size of GOP being 12 images, in this case one finds an I image every 12 images.

audio decoding:

This decoding is performed in parallel with the video decoding. The volume of processing relating to this decoding is much lower, the audio signal is resynchronized with the video signal at the output of the decoder. When going from one program to another, the switching time for the audio is of the order of an audio frame, that is to say several tens of milliseconds (of the order of from 1 to 2 video images).

Originally, MPEG-4 had to help to allow improvement in the rate of compression of the information to be transmitted. In the course of standardization, MPEG-4 has become more generally a "toolbox" allowing a lower compression rate but at the same time also introducing novel notions of coding such as for example the concept of "video object" (VOP standing for Video Object Plane). Thus several video objects can be transmitted simultaneously; the characteristics of the final scene comprising these objects are also compressed and transmitted in the digital stream. The MPEG-4 decoder therefore has to recover this scene and decode the objects of which it is composed.

The new idea introduced by MPEG-4 resides in these concepts of objects regarded as entities and of scene reconstructed on the basis of these various objects. According to one variant of the invention, these notions are what are used for the implementation of the invention.

To limit the idle time when switching from one programme to another, it is necessary for information corresponding to the new program selected to be made immediately available. The idea is therefore to insert, at the MPEG stream level, appended data corresponding to the various programs which the viewer may access. In the case of MPEG4, use is made of this standard's concept of object by associating an object with each item of information pertaining to a program. To have rapid switching and to be able to display the content of the selected program immediately, the corresponding object must contain relevant information about this program. This should at minimum be a still image representative of the transmission in progress, possibly with some text, graphical information (logo) or associated sound. To reduce the volume of these appended data to be transmitted, it is also possible for these objects to be greatly compressed with the possibility of subsampling. The principal idea is to be able rapidly to ascertain the content of the selected program without waiting the customary 2 or 3 seconds. On the other hand, the information obtained is not necessarily very recent nor of the same resolution as that of a program. The principal aim is to be able to determine which program is involved.

The switching device according to the invention therefore contains, in its memory, compressed information (objects) corresponding to the appended data and decodes it when the user requests access to a given program. This decoding is very rapid in so far as relative to the operations necessary for complete program switching, only the taking into account of the request and the decoding are necessary. One will thus go from the initial program to the still image of the program requested and then to the "live" program itself.

A certain number of effects can be used to manipulate and present the information contained in these appended data: lap dissolve, page turn, mosaic, horizontal or vertical scrolling, etc. These images may also receive a visual wrapping including textual or graphical information when they form part of these appended data.

Various descriptions of the mode of presentation, which are predefined by the program provider, may be transmitted. The mode of presentation may also be defined locally by each user who can choose not only the visual look, but also the mode of navigating among the programs (creation of lists based on subject matter or preference etc.).

FIG. 1 describes the coding device for inserting appended data implementing the coding process according to the invention.

Such equipment is installed at the point of transmission of the programs or else upstream of this point in the production chain. It can operate either on the initial audio/video streams, or on the already coded and multiplexed streams.

It is this second solution which is described herein-below.

A group of inputs of the device receives the digital streams from the program provider. A separate input recovers any complementary information of the various programs such as text, logos of the stations etc.

Each input i of the group of inputs is respectively linked to a demultiplexing circuit 1$i$ then to a decoding and selection circuit 2$i$. The outputs of the decoding and selection circuits 2$i$ are linked to the inputs of a re-encoding circuit 3. This circuit transmits information to a circuit for premultiplexing the appended data 4. The second input of the device which receives the complementary information is linked to a mode of presentation creation circuit 5 whose output is linked to a second input of the premultiplexing circuit 4. The information output by this circuit is transmitted to an appended data insertion circuit 6. Finally, a central command and control circuit 7 is linked to the various circuits to control and manage the control and synchronization signals.

Thus, each incoming digital stream i, in our example a transport stream TS coded according to the MPEG2 standard, is transmitted to a demultiplexing circuit 1i.

A transport stream consists of multiplexed elementary streams (ES). Each data stream TS corresponds to several television programs (stations), ten or so for example, the data packets corresponding to a program being identified, among other things, by the PID identification headers (Packet IDentifier).

The demultiplexing circuits 1$i$ perform the demultiplexing of each of the transport streams i so as to extract therefrom the elementary streams corresponding to the various programs. These elementary streams ES are transmitted to the decoding and selection circuits 2$i$. Each of these circuits analyses the structure of each ES stream and extracts, according to a given sequencing, an image for each PID header. The extracted data are general intra-type image data. This selection can be made either with a fixed periodicity, or as a function of significant shot changes. The extracted data can also be images of inter type, the images then being decoded on the basis of previous extracted data.

A re-encoding device 3 has the function of re-encoding the selected images transmitted by the decoding and selection circuits 2$i$ by recompressing these images according to a coding procedure specific to the application, that is to say using all or some of the following techniques allowing greater or lesser compression of the appended data to be transmitted:

spatial filtering and sub-sampling temporal filtering and sub-sampling adjustment of the quantization intervals taking into account of spatial redundancies for each program, on the basis of the subset of images previously selected and coded.

Optionally, the decoding and selection as well as the re-encoding can also relate to the audio.

A scene description (script) circuit 5 for defining modes of presentation receives complementary data, provided on an input of the coding device, for each of the programs, for example the program number, the name, the start and end of broadcasting time for the transmission in progress, for the next transmission, etc., so as to be able to add, among other things, text information to the image. Various modes of presentation may be defined for the composition of the audiovisual data (picture+text+graphic+sound).

A pre-multiplexing circuit 4 carries out the packetization and synchronization of the various audiovisual data received from the re-encoding circuit 3 and of the data relating to the modes of presentation received from the scene description circuit 5.

Finally, all these data are inserted into the TS streams on the basis of the data insertion circuit 6 which inserts into each of the initial TS streams the appended data originating from the premultiplexing circuit 4.

A command/control platform 7 of the equipment makes it possible to synchronize the various signals exchanged.

Given the considerable number of programs which may be accessible to the viewer in a digital package, several tens of programs, it will not necessarily be possible to have access to all the programs and to benefit from a considerable volume of information for each of them. The additional information conveyed on the MPEG stream (appended data) must represent a low throughput relative to the initial stream. A number of principles must therefore be adopted as a function of the constraint imposed on the throughput:

for each program, the volume of information must be limited in such a way as not to overload the MPEG stream and on the other hand to limit the memory required, at decoder level, to carry out the function. The video information will for example be under-sampled and greatly compressed. It should be recalled that the aim is to have a rapid idea of the content of the program, before obtaining the full definition, if one wishes to remain on this program. It is therefore possible to make do with a still image of low definition for the 2 or 3 seconds that the transition will last.

the still image must be regularly refreshed so that its content is always representative of the actual content of the program. This may, for example, be a periodic refresh every 30 seconds, plus a refresh if the content so demands (change of shot, of transmission, etc.). This refresh information, transmitted in the MPEG stream, is intercepted by the decoder which stores it in the case where the viewer may request it therefrom. A new image will then update that already present in memory, it then being possible for the latter to be presented.

the information of audio or text type can be refreshed more regularly in so far as it involves less considerable volumes of information. It is thus possible to write the title of the program, the duration already elapsed, the time remaining before the start of another program. All this information is regularly updated and saved in the memory of the decoder.

in the case where the number of programs accessible is considerable, and the local storage capacity limited, it is possible to limit the stored information:

to the preferred programs defined by the user to the programs whose numbers are similar to the current program, for example 5 or 10 above or below, so as to allow switching with the usual remote control buttons Prog(+) and Prog(−), the user having previously ranked his stations on the basis of interest to the types of programs, for example by subject matter to the programs which are going to start or have started recently.

Of course, this list is not exhaustive and the selection criteria can be defined by the user.

Figure 2:
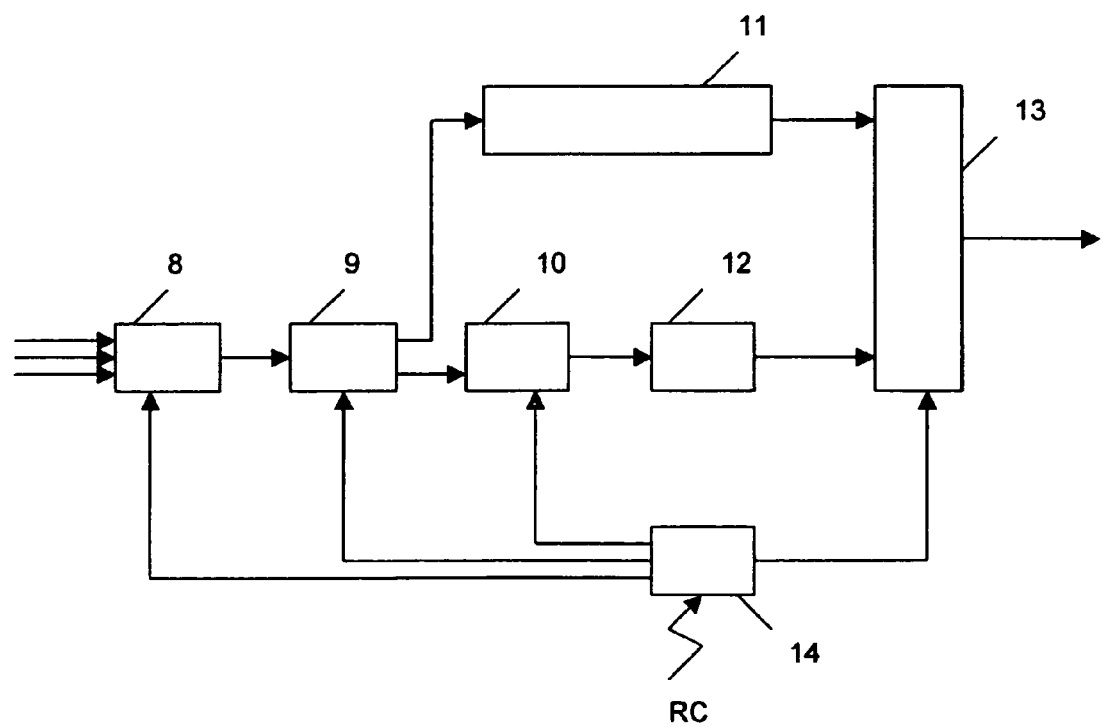
FIG. 2 represents a device for switching programs according to the invention.

FIG. 2 describes a program-switching device implementing the process according to the invention.

The transport streams TS are received on a group of inputs or an input so as to be transmitted to a low noise block LNB 8. The signal output by this block is transmitted to a demultiplexing circuit 9. A first output of this circuit transmits the audio and video data of a program to a decoding circuit 11 and a second output transmits the appended data added at decoder level and relating to other programs, as was indicated previously, to a storage circuit 10. This latter information is then transmitted to a circuit for decoding the appended data 12. A switching circuit 13 receives the information from the two decoders 11 and 12, hence relating to the program displayed and to other programs, and the information from a remote control decoding circuit 14 so as to provide the video at the output of the device.

The remote control decoding circuit 14 receives information from the remote control RC and also transmits data on a second input of the circuit 8, of the circuit 9 and of the circuit 10.

The reception circuit 8 comprises a low noise block LNB which therefore receives the various streams TS originating from the coder, for example by way of transponders. On the second input of this circuit is received information originating from the remote control decoding circuit 14, among other things a signal indicating which program has been selected or the frequency band relating to the program selected. This circuit 8 also comprises a demodulator and its function is therefore to amplify, to select and to demodulate the signals as a function of the program chosen. At its output it provides the data stream comprising several programs (around 8), including the one selected via the remote control. Regardless of the frequency band selected, the appended data being present in all the streams, they are available in the transport stream selected.

The demultiplexing circuit 9 receives from the remote control decoding circuit 14 a signal indicating to it the program which it must select from the incoming transport stream. From this stream the circuit extracts the packets corresponding to the selected program and the packets corresponding to the appended data, that is to say to the images of intra type of the programs as well as to the complementary information used for the visual wrapping. The packets or current data corresponding to the program selected are dispatched, via a first output, to the circuit for decoding the program 11 and the packets corresponding to the appended data are directed, via a second output, to the storage memory 10. The circuit for decoding the current program 11 performs the decoding of the packets which it receives from the demultiplexing circuit. This is the function found in contemporary digital decoders.

The storage memory 10, for example of RAM random access memory type, receives the appended data packets from the demultiplexing circuit 9 so as to store them at an address related for example to the PID and replaces the previous information corresponding to the same program which is therefore overwritten (data refreshing). When the viewer requests a new program, the remote control decoding block 14 generates the address of the memory containing the information relating to this new program. The memory is therefore read out immediately and the information is transmitted immediately to the decoder of the appended data 12. The decoding of this transition information is then performed instantly by this circuit 12. Since this mainly involves information coded in intra mode (still image), the decoding time is of the order of an image or even less if the computational power so permits.

The final scene is reconstructed by the switching circuit 13. This scene reconstruction function could equally well be carried out by a separate circuit utilizing the data originating from the circuit for decoding the appended data 12.

When a switching request is made, the remote control decoding block 14 dispatches a signal to the switching circuit 13 which replaces at its output the data of the program displayed, originating from the decoding circuit 11, with the transition information calculated by this switching circuit in its scene reconstruction function, on the basis of the appended data originating from the decoding circuit 12. When the complete decoding of the new program is operational, this transition information is in turn replaced with the current data of the new program selected. Of course, the function carried out by the circuit can be much more complex than a simple switching between its two inputs. It is thus possible to implement a scenario making it possible to go in a sophisticated manner from the old program (output of the decoder 11) to the new program (decoder 12), for example by creating visual effects.

The response time between the control effected by the viewer and the appearance of the signal requested at the output of the decoder is, by virtue of the invention, greatly diminished. The 2 to 3 seconds of idle time existing in contemporary decoders are due to the routing of the request which must act on the LNB and then on the demultiplexing circuit and thereafter on the digital decoding. The invention presented here makes it possible to limit this routing to the reading out of the memory and to the intra decoding and therefore makes it possible to obtain a response time of the order of an image period (20 ms). The 2 to 3 seconds are thus reduced to a few image periods, this being acceptable when one wishes to access another program rapidly, for example while perusing.

Within the context of the MPEG standard and of satellite transmission, a program corresponds to a mean throughput of the order of 4 Mbits/s. An intra image having for example a resolution 4 times lower than that of a standard image corresponds to a coding cost whose order of magnitude is 100 kbits, giving a rate of 10 kbits/s if the intra image is dispatched every 10 seconds. Thus, data transmitted for one hundred or so programs correspond to a throughput of the order of 1 Mbits/s, on each of the transponders.

These appended data can be transmitted either instead of a program, or as a supplement to the data of the various programs, for example by slightly reducing their throughput. This program (station) can then be chosen so as to display a mosaic of a considerable number of stations.

An application of the invention relates to the automatic changing of program by programming the switching device.

In the same way as a video recorder is programmed on the basis of its internal clock, it is possible, by virtue of the information conveyed in the MPEG stream relating to the start time of a selected program, to program automatic switching to this program at the instant corresponding to the time read from the MPEG stream.

Another application of the invention relates to the creation of an image inset, known as a PIP, standing for the expression Picture in Picture. This displayed image, or these images if one chooses multiple windows, does not require the complete decoding of several streams. This displaying of the complementary information in a PIP window makes it possible to "monitor" another program, for example the commencement of a new transmission.

What is claimed is:

1. A process for coding compressed video data streams relating to television programs to provide adapted video data streams, the process comprising:
   extracting data relating to pictures of various programs not being viewed by a viewer from the compressed video data streams;
   inserting the extracted data in the form of appended data into each of the compressed video data streams to obtain adapted video data streams for use when switching television programs; and
   displaying said appended data corresponding to a desired program to the viewer in response to a received command to change the currently viewed television program.

2. The process according to claim 1, wherein said extracting includes detecting pictures of an intra type in the compressed video data streams.

3. The process according to claim 1, wherein said extracting includes detecting pictures of an inter type in the compressed video data streams.

4. The process according to claim 1, further comprising processing the appended data to reduce the resolution of extracted images.

5. The process according to claim 1, wherein said appended data includes complementary data.

6. The process according to claim 5, wherein said complementary data includes at least one of a number of a program, a name of a program, a start and end time of a program in progress; a start and end time of a coming program, and a logo of a station broadcasting the program.

7. A process for switching television programs comprising:
   detecting program data of television programs other than a selected program;
   storing the detected program data in the form of appended data;
   selecting and decoding the stored appended data relating to a new program to be selected in response to a user command to view the new program; and
   temporarily transmitting the decoded appended data to a display for user viewing while awaiting decoding and transmission of current data relating to the newly selected program.

8. The process according to claim 7, wherein said step of detecting is performed from compressed video data streams relating to the television programs.

9. The process according to claim 7, wherein said appended data is detected on the basis of pictures of intra type in the compressed video data stream.

10. The process according to claim 7, wherein said appended data is detected on the basis of pictures of an inter type in the compressed video stream.

11. The process according to claim 7, wherein said appended data includes complementary data relating to at least one of the following: i) a number of a program; (ii) a name of a program; (iii) start and end time of a program in progress; (iv) start and end time of a coming program; and (v) the logo of the station broadcasting a program.

12. The process according to claim 7, further comprising creating at least one of a mosaic and an interactive electronic program guide based on said appended data.

13. The process according to claim 7, wherein said detected data stream is an MPEG 2 coded stream having data packets, wherein data packets relating to said appended data is temporarily transmitted.

14. A device for switching a television program and eliminating delay between program selection comprising:
   a detection circuit for detecting program data in received coded data streams of programs other than a selected program;
   a storage device for storing the detected program data in the form of appended data;
   a selection circuit for selecting the stored appended data based on a received command to display a new program;
   a decoding circuit for decoding the selected appended data; and
   a switching circuit receiving the decoded output of said decoding circuit and enabling a temporary switch over to the selected appended data for display.

15. The device according to claim 14, wherein said appended data comprises data relating to images of available programs not currently being viewed.

* * * * *